United States Patent
Hasan

(10) Patent No.: US 12,386,846 B2
(45) Date of Patent: Aug. 12, 2025

(54) METHOD AND SYSTEM FOR INTEGRATING DATA FROM DIFFERENT DATA SOURCES INTO A KNOWLEDGE GRAPH STORAGE UNIT

(71) Applicant: Siemens Aktiengesellschaft, Munich (DE)

(72) Inventor: Rakebul Hasan, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 180 days.

(21) Appl. No.: 17/288,750

(22) PCT Filed: Oct. 30, 2019

(86) PCT No.: PCT/EP2019/079581
§ 371 (c)(1),
(2) Date: Apr. 26, 2021

(87) PCT Pub. No.: WO2020/089259
PCT Pub. Date: May 7, 2020

(65) Prior Publication Data
US 2022/0121674 A1    Apr. 21, 2022

(30) Foreign Application Priority Data
Oct. 30, 2018  (EP) .................. 18203407

(51) Int. Cl.
*G06F 16/25* (2019.01)
*G06N 5/022* (2023.01)

(52) U.S. Cl.
CPC ........... *G06F 16/254* (2019.01); *G06N 5/022* (2013.01)

(58) Field of Classification Search
CPC ...... G06F 16/254; G06F 16/27; G06F 16/248; G06N 5/022
See application file for complete search history.

(56) References Cited

U.S. PATENT DOCUMENTS

| 11,068,439 B2 * | 7/2021 | Bicer .................... G06F 16/116 |
| 2012/0265727 A1 * | 10/2012 | Naryzhnyy ........... G06F 16/258 |
| | | 707/602 |

(Continued)

FOREIGN PATENT DOCUMENTS

| CN | 106611046 A | 5/2017 |
| CN | 108092954 A | 5/2018 |

OTHER PUBLICATIONS

Jain et al. "GraphBuilder: Scalable Graph ETL Framework," Jun. 2013, First International Workshop on Graph Data Management Experiences and Systems, Article No. 4, pp. 1-6 (Year: 2013).*

(Continued)

*Primary Examiner* — Charles D Adams
(74) *Attorney, Agent, or Firm* — Schmeiser, Olsen & Watts LLP

(57) ABSTRACT

A method for integrating data from different data sources into a knowledge graph storage unit including:
transferring data from different data sources into a receiving and extraction module of an extraction-transformation-loading, ETL, data pipeline framework;
extracting the loaded data using an extraction data frame and transferring the extracted data to a transformation module;
transforming the extracted data using transformation functionalities and transferring the transformed data to a mapping module;
mapping the transformed data using mapping rule functionalities and transferring the mapped data to a post-processing module;

(Continued)

post-processing the mapped data using a library and transferring the post-processed data to a loading module; and loading the processed data by the loading module to the knowledge graph storage unit;

wherein the mapping module uses a JSON-based mapping notation to convert the transformed data into a serialized form, is provided.

14 Claims, 2 Drawing Sheets

(56) References Cited

U.S. PATENT DOCUMENTS

| | | | |
|---|---|---|---|
| 2015/0317356 A1 | 11/2015 | Deichler | |
| 2017/0293697 A1* | 10/2017 | Youshi | G06F 16/84 |
| 2018/0011655 A1 | 1/2018 | Gredler et al. | |
| 2018/0144822 A1 | 5/2018 | Guendel et al. | |
| 2018/0232443 A1* | 8/2018 | Delgo | G06F 16/35 |

OTHER PUBLICATIONS

Dimou et al. "RML: A Generic Language for Integrated RDF Mappings of Heterogeneous Data", 2014. Ldow 1184 (Year: 2014).*

Vassiliadis, Panos, "A Survey of Extract-Transform-Load Technology," Integrations of Data Warehousing, Data Mining and Database Technologies: Innovative Approaches. IGI Global, 2011. 171-199. Web. May 29, 2018. DOI=http://dx.doi.org/10.4018/978-1-60960-537-7.ch008; 2011; 2 pages.

"Introduction to DirXML," Internet Citation, 2002, XP002309373, Retrieved from the Internet:URL:http://developer.novell.com/education/tutorials/introdirxml/introDirXML.pdf [retrieved on Dec. 6, 2004]; pp. 4, lines 12-14, pp. 6, lines 18-20, pp. 15, lines 4-9, pp. 26, lines 11-29, pp. 31, lines 11-19, pp. 32, lines 32-34, pp. 36, lines 2-10, pp. 37, lines 4-15; 116 pages.

"Novell DirXML Administration Guide," Internet Citation, 2002, XP002309371, Retrieved from the Internet:URL: http://www.directory-info.com/DirXML/dirxmlAdmin.pdf, [retrieved on Nov. 24, 2004], pp. 11, lines 2-9, pp. 19, lines 1-15, pp. 20, last line-pp. 2, line 2, pp. 23, line 5-pp. 28, line 8, pp. 32, lines 4-9; 224 pages.

Slepicka, J., et al., "KR2RML: An Alternative Interpretation of R2RML for Heterogenous Sources," In O. Hartig, J. Sequeda & A. Hogan (eds.), Cold: CEUR-WS.org.; (2015); 12 pages.

Lehmann, J., et al., "Distributed Semantic Analytics using the SANSA Stack," Proceedings of 16th International Semantic Web Conference—Resources Track (ISWC'2017); (2017); 8 pages.

Hert, Matthias, et al., "A comparison of RDB-to-RDF mapping languages," In Proceedings of the 7th International Conference on Semantic Systems (I-Semantics '11, Chiara Ghidini, Axel-Cyrille Ngonga Ngomo, Stefanie Lindstaedt, and Tassilo Pellegrini (Eds.). ACM, New York, NY, USA, 25-32. DOI=http://dx.doi.org/10.1145/2063518.2063522; (2011); 2 pages.

International Search Report and Written Opinion in corresponding PCT Patent Application No. PCT/EP2019/079581 dated Dec. 11, 2019. 14 pages.

* cited by examiner

METHOD AND SYSTEM FOR INTEGRATING DATA FROM DIFFERENT DATA SOURCES INTO A KNOWLEDGE GRAPH STORAGE UNIT

CROSS-REFERENCE TO RELATED APPLICATIONS

This application is a national stage entry of PCT Application No. PCT/EP2019/079581, having a filing date of Oct. 30, 2019, which claims priority to European Patent Application No. 18203407.4, having a filing date of Oct. 30, 2018, the entire contents of which are hereby incorporated by reference.

FIELD OF TECHNOLOGY

The following generally relates to a system and method for integrating data from different data sources into a knowledge graph storage unit.

BACKGROUND

There is an increasing trend of industrial automation systems, assets, machines, sensors, mobile devices etc. in all fields of industrial production, energy, transportation and in other areas as banking, retail, hospitality and medical health care systems being connected via network connections to the Industrial Internet of Things (IIoT) directly or via cloud gateways. Data analytics (data mining, deep learning, artificial intelligence) is a core aspect in this whole area of connected things and generates a new level of knowledge and usability.

In systems based on cloud computing technology, a large number of devices is connected to a cloud computing system via the Internet. The devices may be located in a remote facility connected to the cloud computing system. For example, the devices can comprise, or consist of, equipment, sensors, actuators, robots, and/or machinery in an industrial set-up(s). The devices can be medical devices and equipment in a healthcare unit. The devices can be home appliances or office appliances in a residential/commercial establishment.

The cloud computing system may enable remote configuring, monitoring, controlling, and maintaining connected devices (also commonly known as 'assets'). Also, the cloud computing system may facilitate storing large amounts of data periodically gathered from the devices, analyzing the large amounts of data, and providing insights (e.g., Key Performance Indicators) and alerts to operators, field engineers or owners of the devices via a graphical user interface (e.g., of web applications). The insights and alerts may enable controlling and maintaining the devices, leading to efficient and fail-safe operation of the devices.

An increasingly popular approach for analysing this data is the concept of Knowledge Graphs. Current approaches for inserting data from heterogeneous data sources—such as database systems, files in different formats, the Web, or any edge device that generates data—into a Knowledge Graph include the main step of mapping the source data to a representation for a Knowledge Graph. Such an approach is described by Matthias Hert et al. [Matthias Hert, Gerald Reif, and Harald C. Gall. 2011. "A comparison of RDB-to-RDF mapping notations." In Proceedings of the 7th International Conference on Semantic Systems (I-Semantics '11, Chiara Ghidini, Axel-Cyrille Ngonga Ngomo, Stefanie Lindstaedt, and Tassilo Pellegrini (Eds.). ACM, New York, NY, USA, 25-32. DOI=http://dx.doi.org/10.1145/2063518.2063522]. Thereby, the data cleaning and transformation steps are incorporated in the mapping process itself which complicates the process of authoring and maintaining the mapping rules. In addition, it is needed that the users of such mapping rules have expertise of both the data source systems that produce the data and the Knowledge Graphs, which is often difficult to achieve. Finally, these approaches do not provide adequate support for large scale data processing frameworks.

Moreover, recently significant advancements in the field of data warehouse technologies have been achieved. The process of populating data warehouses commonly known as an Extraction-Transformation-Loading (ETL) process includes (i) data extraction from a data source, (ii) transferring the data to a data processing platform, (iii) transformation of the data compatible with a target data storage system, (iv) final cleaning and refinement of the data, (v) loading the cleaned and transformed data to the target data storage system. Such an approach is described by P. Vassiliadis [Panos Vassiliadis. "A Survey of Extract-Transform-Load Technology". Integrations of Data Warehousing, Data Mining and Database Technologies: Innovative Approaches. IGI Global, 2011. 171-199. Web. 29 May 2018. DOI=http://dx.doi.org/10.4018/978-1-60960-537-7.ch008]. As a result of the recent technological progress in this field, there exist effective and widely accepted technologies for all of these steps. For example, Apache Hadoop™ is a unified analytics platform for large-scale data processing; Apache Spark™ is a framework for cluster computing such as data extraction, transformation, cleaning, and loading with support for Apache Hadoop™; relational databases systems and flat files in various formats are available; a more light-weight library similar to Apache Spark™ called Pandas but with a fast in-memory computation capability; Luigi, an open source framework for building data pipelines for ETL (a data pipeline is a set of data processing elements connected in series, where the output of one element is the input of the next one).

A KR2RML-processor is described by J. Slepicka et al. [Slepicka, J., Yin, C., Szekely, P. A. & Knoblock, C. A. (2015). KR2RML: An Alternative Interpretation of R2RML for Heterogenous Sources. In O. Hartig, J. Sequeda & A. Hogan (eds.), COLD: CEUR-WS.org.]. This KR2RML-processor supports Apache Hadoop™ and Apache Storm™ for a large-scale Resource Description Framework (RDF) data generation from heterogeneous data sources. However, the data transformation step has to be specified along with the mapping. This means transformation processing steps need to be defined in the mapping rule definitions. This results in a non-modular code which is difficult hard to maintain and author. In addition, the KR2RML-processor does not support Apache Spark™.

A further approach is the SANSA stack as described by J. Lehmann [Lehmann, J., Sejdiu, G., Bühmann, L., Westphal, P., Stadler, C., Ermilov, I., Bin, S., Chakraborty, N., Saleem, M., Ngonga, A.-C. N. & Jabeen, H. (2017). Distributed Semantic Analytics using the SANSA Stack. Proceedings of 16th International Semantic Web Conference—Resources Track (ISWC'2017)]. The SANSA stack is a platform for distributed data processing for large-scale RDF datasets. Although it supports Apache Spark™, it does not provide a mapping processor. This means that it can only work with data which is already in an RDF format. Therefore, both KR2RML and SANSA do not provide support for Pandas.

Introduction to DirXML (Internet, XP002309373, retrieved from the URL http://developer.novell.com/education/tutorials/introdirxml/introDirXML.pdf) on Dec. 6, 2004, discloses the connector technology DirXML. DirXML is a bi-directional data sharing service that leverages eDirectory to distribute new and updated information across directories, databases, and critical applications on the network and across firewall. An existing network infrastructure may be synchronized with different external data sources.

Novell DirXML Administration Guide (Internet, XP002309371, retrieved from the URL http://directory-info.com/DirXML/dirxmlAdmin.pdf) on Nov. 24, 2004, discloses Novell DirXML that is a data sharing service that runs on NDS (Novell Directory Services). This data sharing service enables the networking of application data through eDirectory. DirXML enables an application to bidirectionally share and synchronize selected data with eDirectory and with other applications connected to eDirectory with DirXML drivers.

SUMMARY

An aspect of the present invention relates to providing techniques that assist in improving the integration of data from different data sources into a knowledge graph storage unit.

According to a first aspect of the present invention, a method for integrating data from different data sources into a knowledge graph storage unit is provided. The method comprises the following steps:
  (a) transferring data from different data sources into a receiving and extraction module of an extraction-transformation-loading, ETL, data pipeline framework;
  (b) extracting the loaded data in the receiving and extraction module by using an extraction data frame and transferring the extracted data to a transformation module of the ETL data pipeline framework;
  (c) transforming the extracted data in the transformation module by using transformation functionalities and transferring the transformed data to a mapping module of the ETL data pipeline framework;
  (d) mapping the transformed data in the mapping module by using mapping rule functionalities and transferring the mapped data to a post-processing module of the ETL data pipeline framework
  (e) post-processing the mapped data in the post-processing module by using a library and transferring the post-processed data to a loading module of the ETL data pipeline framework;
  (f) loading the processed data by the loading module to the knowledge graph storage unit.

The mapping module uses a JSON-based mapping notation to convert the transformed data into a serialized form.

In an exemplary embodiment, an open source framework for building data pipelines for ETL is used for the ETL, data pipeline framework. A data pipeline is a set of data processing elements connected in series.

In a further embodiment, the extraction data frame is a lightweight library data frame with a fast in-memory computation capability or a data framework for cluster computing.

In an exemplary embodiment, for the transformation functionalities the lightweight library data frame with a fast in-memory computation capability or the data framework for cluster computing is used.

In a further exemplary embodiment, for large-scale data sources the ETL data pipeline framework is extended by an Apache Hadoop™ cluster, wherein the Apache Hadoop™ is a unified analytics platform for large-scale data processing.

In an advantageous embodiment, the library in the post-processing module is a Phyton™ library (RDFLib) for in-memory graph processing using the lightweight library data frame with a fast in-memory computation capability or a SANSA Rdf for RDF graph processing using the data framework for cluster computing, wherein the SANSA Rdf is a scale library.

According to a second aspect of the present invention, a system for integrating data from different data sources into a knowledge graph storage unit is provided. The system comprises an extraction-transformation-loading, ETL, data pipeline framework, wherein the extraction-transformation-loading, ETL, data pipeline framework comprises:
  a receiving and extraction module configured to receive data from different data sources and to extract the data by using an extraction data frame;
  a transformation module configured to receive the extracted data which are transferred to the transformation module and to transform the extracted data by using transformation functionalities;
  a mapping module configured to receive the extracted data which are transferred to the mapping module and to map the extracted data by using mapping rule functionalities;
  a post-processing module configured to receive the mapped data which are transferred to the post-processing module and to post-process the mapped data by using a library; and
  a loading module configured to receive the post-processed data which are transferred to the loading module and to load the processed data to the knowledge graph storage unit.

The mapping module uses a JSON-based mapping notation to convert the transformed data into a serialized form.

In an exemplary embodiment, an open source framework for building data pipelines for ETL is used for the ETL, data pipeline framework. A data pipeline is a set of data processing elements connected in series.

In a further embodiment, the extraction data frame is a lightweight library data frame with a fast in-memory computation capability or a data framework for cluster computing.

In an exemplary embodiment, for the transformation functionalities the lightweight library data frame with a fast in-memory computation capability or the data framework for cluster computing is used.

In a further exemplary embodiment, for large-scale data sources the ETL data pipeline framework is extended by an Apache Hadoop™ cluster, wherein the Apache Hadoop™ is a unified analytics platform for large-scale data processing.

In an advantageous embodiment, the library in the post-processing module is a Phyton™ library (RDFLib) for in-memory graph processing using the lightweight library data frame with a fast in-memory computation capability or a SANSA Rdf for RDF graph processing using the data framework for cluster computing, wherein the SANSA Rdf is a scale library.

BRIEF DESCRIPTION

Some of the embodiments will be described in detail, with reference to the following figures, wherein like designations denote like members, wherein.

DETAILED DESCRIPTION

In the following description, for purposes of explanation and not limitation, specific details are set forth in order to provide a thorough understanding of the present invention. It will be apparent to one skilled in the art that the present invention may be practiced in other implementations that depart from these specific details.

Figure 1:
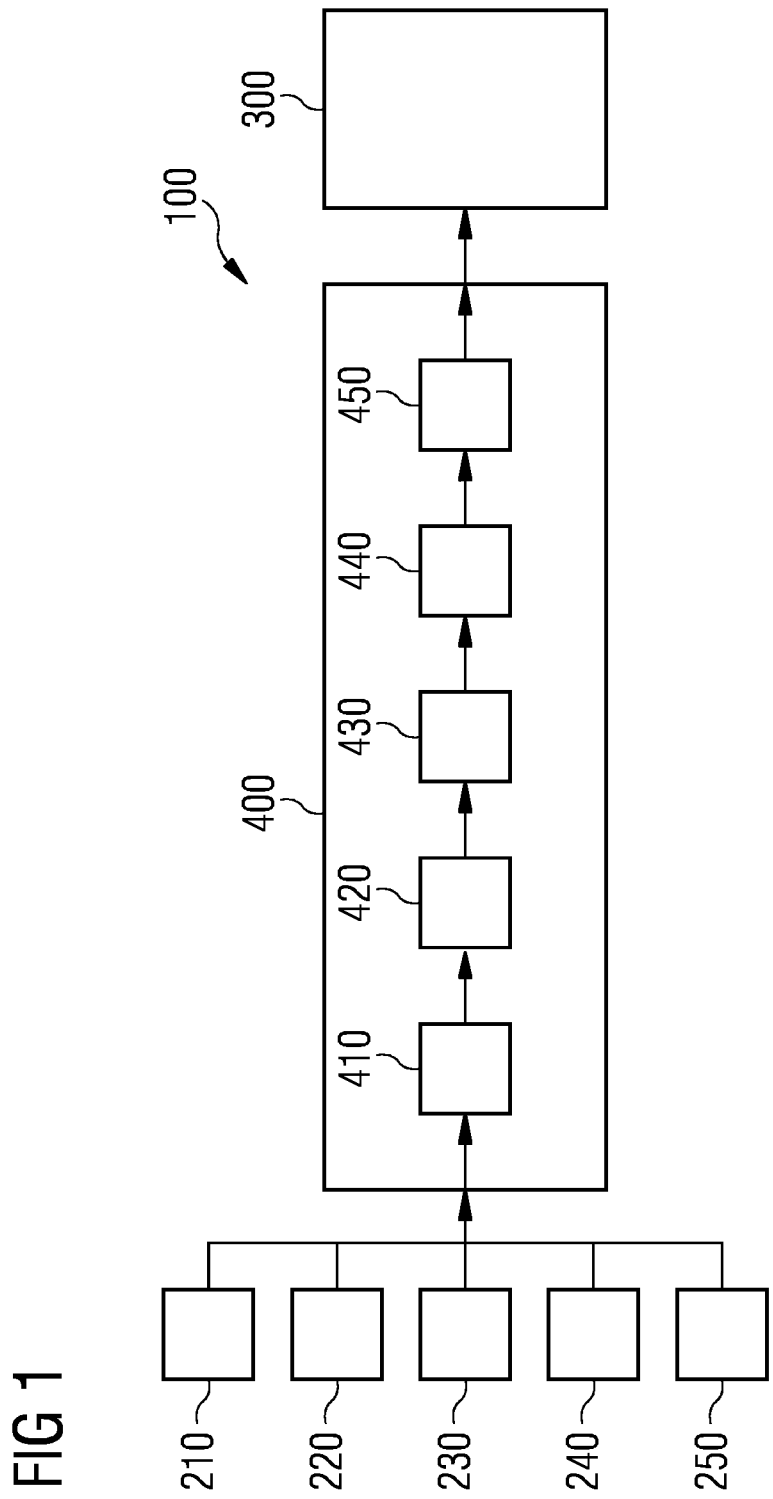
FIG. 1 depicts a schematic block diagram illustrating a first embodiment of the system according to the first aspect of the present invention.

FIG. 1 describes a system 100 for the integration of data from different data sources 210, 220, 230, 240, 250 into a knowledge graph storage unit 300. For the integration of the data into the knowledge graph storage unit 300 an extraction, transformation, loading (ETL) data pipeline framework 400 is used. The ETL data pipeline framework 400 comprises a receiving and extraction module 410, a transformation module 420, a mapping module 430, a post-processing module 440 and a loading module 450.

According to the system and method of the present invention, the data transformation step in the transformation module 420 is decoupled from the data mapping processing in the mapping module 430. For the ETL data pipeline framework 400 the framework Luigi may be used.

Figure 2:
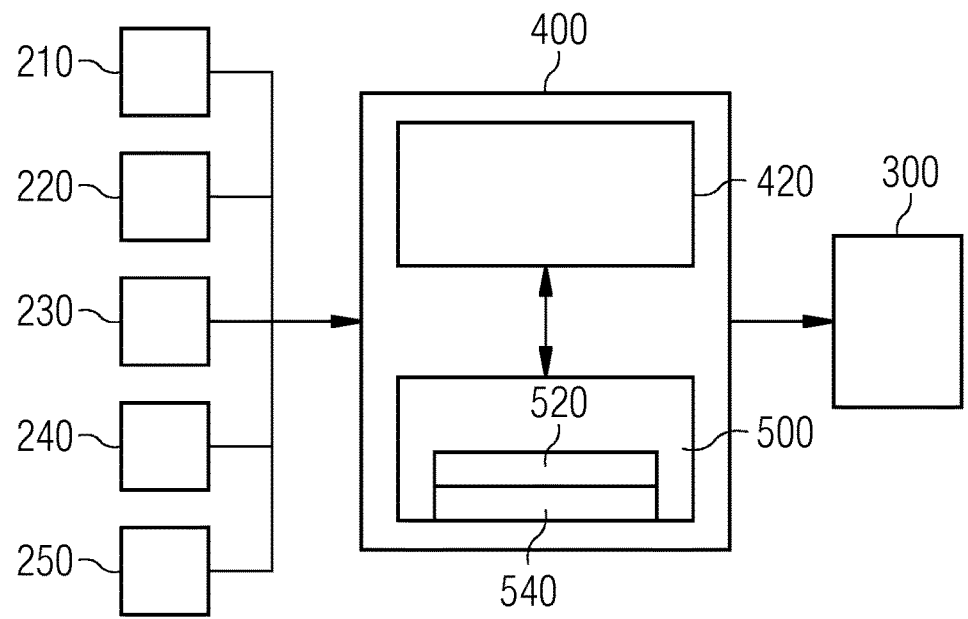
FIG. 2 depicts a schematic block diagram illustrating a second embodiment of the system according to the first aspect of the present invention.

FIG. 2 illustrates a further embodiment relating to a large-scale data processing system 110 for integrating data into knowledge graphs storage units 300 from heterogeneous data sources 210, 220, 230, 240 like relational databases, sensors, different file formats, web services. One or more of the data sources 250 can comprise large-scale data storage systems such as Apache Hive™ by means of extending the ETL data pipeline framework 400 by an ETL execution system 420 and an Apache Hadoop™ cluster 500. The data pipeline framework 400 interacts with the input data from the different data sources 210, 220, 230, 240, 250 by using the load and extraction functionalities of an Apache Spark™ data framework 520 of the Apache Hadoop™ cluster 500, then it transforms the data by using transformation functionalities of the Apache Spark™ data framework 520, then the mapping module 430 converts the data of an Apache Spark™ data frame format into an RDF format, then the data pipeline framework 400 uses an SANSA RDF format to perform post-processing, and finally the data pipeline framework 400 loads the processed data to the knowledge graph storage unit 300. Due to the usage of the Apache Spark™ framework 520 and the SANSA RDF format, the scalability and the fault-tolerance come for free.

In a further embodiment, instead of using Apache Spark™, the data pipeline framework 400 uses the efficient extraction and transformation functionalities of Pandas. Finally, instead of using the SANSA RDF format as the RDF processing library, the pipeline uses RDFLib in such an embodiment.

Figure 3:
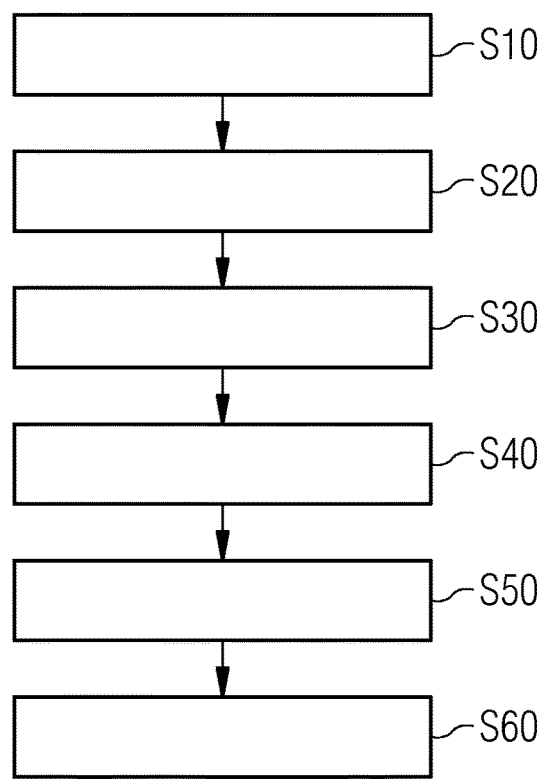
FIG. 3 depicts a schematic flow diagram illustrating an embodiment of a method according to an embodiment of the second aspect of the present invention.

In FIG. 3 show a schematic flow diagram illustrating a method according to an embodiment of the second aspect of the present invention. The method of FIG. 3 will be described partially using reference signs of FIG. 1, although the method is not restricted to the embodiments described in FIG. 1. On the other hand, the method of FIG. 3 may be executed using any of the embodiments described with respect to FIG. 1 and may, accordingly, be adapted and modified according to any variations and modifications described in the foregoing.

In a step S10, the data from different data sources 210, 220, 2230, 240, 250 are loaded into the ETL data pipeline framework 400 by the receiving and extraction module 410.

In a step S20, the loaded data are extracted in the receiving and extraction module 410. The receiving and extraction module 410 uses an extraction data frame such as Pandas Data Frames or Apache Spark™ Data Frames. These data frames provide sufficient support for interacting with various kinds of data sources 210, 220, 230, 240, 250 including relational data storages systems and flat files in various formats. Furthermore, the Apache Spark™ Data Frame also supports large-scale data storage systems. The extracted data is then stored in a local file system or in a HDFS file system 540 in the case of using Apache Spark™ as illustrated in FIG. 2.

In a step S30, the extracted data are transferred to the transformation module 420 where a transformation of the extracted data by using transformation functionalities such as Pandas and/or Apache Spark™ is performed. The transformed data is written to an appropriate file system.

In a step S40, the transformed data is transferred to the mapping module 430 where a mapping of the transformed data by using mapping rule functionalities is performed.

In an exemplary embodiment, the mapping module 430 uses a JSON-based mapping rule definition to convert the transformed data in a serialized format. JSON is a widely accepted data format for ETL processing activities. The JSON-based mapping notation allows defining the relationship between data frame columns to RDF triples. The mapping module 430 is able to apply these mapping rules to both Pandas and Apache Spark™ data frames and convert their data to an RDF frame. Therefore, according to an exemplary embodiment of the method and system of the present invention, an intuitive JSON-based mapping notation with a processor for transforming Apache Spark™ and Pandas data formats to an RDF frame can be used. As a JSON-based mapping notation does not support data manipulation and transformation operations the integrity of the data can be ensured. Furthermore, a JASON-based mapping notation is declarative so that mapping rules are easier to update and to manage in contrast to imperative rules encoded in source code.

A JSON-based mapping notation allows defining templates to create directed edges in an RDF graph (RDF triples are named edges in an RDF graph). A collection of such templates is used for a mapping rule definition for a data frame which aims to transform the data loaded in the data frame to RDF. A template to generate an edge in an RDF graph mainly comprises three parts: i) definition of the source node (known as the subject in an RDF triple); ii) definition of the edge label (known as the predicate in an RDF triple); iii) definition of the destination node (known as the object in an RDF triple). The definition of a node contains an associated type—which is a class from an ontology, or an RDF literal data type such as int or bool. Furthermore, such a node definition also contains the name of a column in the source data frame. Each value of such a column could generate a node in the RDF graph. For literal type nodes, the column values are directly used. For resource type nodes (nodes which have an associated type from the ontology), the value is converted to an URI using some predefined expressions provided either in the node definition or created by altering the column value using data frame functionalities for such a modification. According to the RDF specification, the subject nodes can represent only RDF resources, which means they can only have ontology classes corresponding to their types. The definition of edges contains the name of the property—taken from the ontology—that should be used as the predicate in the RDF triple (in other words the edge label).

In an exemplary embodiment the transformed data is serialized using a N-triple format which allows writing one triple. A triple comprises a subject, a predicate, and an object which represents a link to the source node, the labelled edge, and the destination node in an RDF graph per line. This one triple per line representation enables partitioning the output data of the mapping step without losing any information when an Apache Hadoop™ Distributed File System (HDFS) 540 is used as illustrated in FIG. 2.

In a step S50, the post-processing module 440 picks up the data processed in the mapping step, loads the data into a memory. The memory uses a library for processing the mapped data. The library is an RDFLib in the case of Pandas, and a SANSA RDF data format in the case of Apache Spark™. An RDFLib is a Python™ library for in-memory RDF graph processing. SANSA RDF is a scale library for RDF graph processing using Apache Spark™ underneath. The output data of this post-processing step is written to an appropriate file system similar as for all the other previous steps.

In a step 60, the loading module 450 picks up this processed output data and loads it to at least one knowledge graph storage unit 300.

By these steps the integration of data from different data sources is simplified by using a further mapping step S40. Users with ETL skillsets are able to focus on the extraction and transformation steps using well-known and widely used ETL tools such as Pandas and Apache Spark™. Further, users with knowledge graph skillsets can focus on the mapping, post-processing, and loading steps using appropriate tools such as RDFLib and SANSA RDF.

According to the method and system of the present invention, a new mapping notation for the integration of data into a knowledge graph storage unit 300 is provided. The mapping notation is intuitive as it uses a JSON-based familiar syntax for ETL processing activities. Furthermore, the method and system of the present invention provides an interface for converting data in a Pandas Data Frame to RDF data. This enables decoupling transformation from mapping and it allows using efficient in-memory transformation functionalities of Pandas.

Furthermore, the method and system of the present invention provides an interface for converting data in an Apache Spark™ Data Frame to RDF data. This enables decoupling of the data transformation step from the data mapping processing step in a large-scale data scenario. Furthermore, it allows using transformation functionalities of Apache Spark™ in a large-scale data scenario which is scalable and fault tolerant by nature.

The method and system of the present invention simplifies maintenance and authoring of mapping rules for data integration into knowledge graph storage units 300 by decoupling the data transformation step from the mapping processing step.

Furthermore, the method and system of the present invention provides a large-scale data processing system for integrating data into knowledge graph storage units 300 from heterogeneous data sources 210, 220, 230, 240, 250 by means of extending Apache Spark™.

Furthermore, the method and system of the present invention provides an efficient in-memory data processing system for integrating data into knowledge graph storage system 300 from heterogeneous data sources 210, 220, 230, 240, 250 by means of extending Pandas.

Furthermore, the method and system of the present invention provides an intuitive JSON-based mapping notation with a processor for transforming Apache Spark™ and Pandas data formats to RDF formats.

According to the method and system of the present invention, Apache Spark™ and Pandas are extended for transforming their data formats to a knowledge graph representation called RDF. This also includes a new mapping notation for specifying the mapping between the Apache Spark™ and Pandas data formats to RDF formats, and a processor software component for the mapping notation. The mapping notation is formulated in the widely accepted data format JavaScript Object Notation, JSON, and it does not provide any data transformation processing steps. According to the present invention, the mapping processing steps can be simplified by decoupling the data transformation step and using ETL technologies like Apache Spark™ and Pandas instead.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A method for integrating data from different data sources into a knowledge graph storage unit, the method comprising:
   (a) transferring data from different data sources into a receiving and extraction module of an extraction-transformation-loading, ETL, data pipeline framework;
   (b) extracting the loaded data in the receiving and extraction module by using an extraction data frame, storing the extracted data in a distributed file system, and transferring the extracted data to a transformation module of the ETL data pipeline framework;
   (c) transforming the extracted data in the transformation module by using transformation functionalities of the extraction data frame, and transferring the transformed data to a mapping module of the ETL data pipeline framework;
   (d) mapping the transformed data in the mapping module by using a JSON-based mapping notation that converts the transformed data, which is in a data format of the extraction data frame, to a Resource Description Framework (RDF) data format, and transferring the mapped data in the RDF format to a post-processing module of the ETL data pipeline framework;
   (e) post-processing the mapped data in the RDF format in the post-processing module by loading the mapped data in a memory that uses a library, and transferring the post-processed data to a loading module of the ETL data pipeline framework, wherein the library in the post-processing module is a library for in-memory graph processing using a library data frame with in-memory computation capability or a scale library; and
   (f) loading the processed data by the loading module to the knowledge graph storage unit;

wherein the transforming the extracted data performed by the extraction data frame is decoupled from the mapping performed by the JSON-based mapping notation, such that the JSON mapping notation does not perform data manipulation and transforming;

wherein, as a function of the JSON-based mapping notation, directed edges in an RDF graph are created using templates, and the data loaded in a data frame is transformed to RDF data format based on a mapping rule definition for the data frame, based on a collection of the templates;

wherein the JSON-based mapping notation defines a relationship between data frame columns to RDF triples, and the templates include a definition of a source node, which is a subject in an RDF triple, a definition of an edge label, which is a predicate in the RDF triple, and a definition of a destination node, which is an object in the RDF triple, further wherein a node definition also contains a name of a column in the data frame, and each value of the column generates a node in the RDF graph.

2. The method as claimed in claim 1, wherein an open source framework for building data pipelines for ETL is used for the ETL data pipeline framework, and wherein a data pipeline is a set of data processing elements connected in series.

3. The method as claimed in claim 1, wherein the extraction data frame is a library data frame with an in-memory computation capability or a data framework for cluster computing.

4. The method as claimed in claim 3, wherein, for the transformation functionalities, the library data frame with the in-memory computation capability or the data framework for cluster computing is used.

5. The method as claimed in claim 1, wherein the ETL data pipeline framework is extended by an Apache Hadoop™ cluster, wherein the Apache Hadoop™ is a unified analytics platform for data processing.

6. The method as claimed in claim 1, wherein the library in the post-processing module is a Python™ library or a SANSA Rdf for RDF graph processing using a data framework for cluster computing.

7. The method as claimed in claim 1, wherein the mapped data is serialized using a N-triple format.

8. A system for integrating data from different data sources into a knowledge graph storage unit, comprising an extraction-transformation-loading, ETL, data pipeline framework, wherein the extraction-transformation-loading, ETL, data pipeline framework comprises:

a receiving and extraction module configured to receive data from different data sources, extract the data by using an extraction data frame, and store the extracted data in a distributed file system;

a transformation module configured to receive the extracted data which are transferred to the transformation module and to transform the extracted data by using transformation functionalities;

a mapping module configured to receive the extracted data which are transferred to the mapping module and to map the transformed data by using a JSON-based mapping notation that converts the transformed data, which is in a data format of the extraction data frame, to a Resource Description Framework (RDF) data format;

a post-processing module configured to receive the mapped data which are transferred to the post-processing module and to post-process the mapped data in the RDF format by loading the mapped data in a memory that uses a library, wherein the library in the post-processing module is a library for in-memory graph processing using a library data frame with in-memory computation capability or a scale library; and a loading module configured to receive the post-processed data which are transferred to the loading module and to load the processed data to the knowledge graph storage unit;

wherein the transforming the extracted data performed by the extraction data frame is decoupled from the mapping performed by the JSON-based mapping notation, such that the JSON mapping notation does not perform data manipulation and transforming;

wherein, as a function of the JSON-based mapping notation, directed edges in an RDF graph are created using templates, and the data loaded in a data frame is transformed to RDF data format based on a mapping rule definition for the data frame, based on a collection of the templates;

wherein the JSON-based mapping notation defines a relationship between data frame columns to RDF triples, and the templates include a definition of a source node, which is a subject in an RDF triple, a definition of an edge label, which is a predicate in the RDF triple, and a definition of a destination node, which is an object in the RDF triple, further wherein a node definition also contains a name of a column in the data frame, and each value of the column generates a node in the RDF graph.

9. The system claimed in claim 8, wherein an open source framework for building data pipelines for ETL is used for the ETL data pipeline framework, and wherein a data pipeline is a set of data processing elements connected in series.

10. The system as claimed in claim 8, wherein the extraction data frame is a library data frame with in-memory computation or a data framework for cluster computing.

11. The system as claimed in claim 10, wherein, for the transformation functionalities, the library data frame with the in-memory computation or the data framework for cluster computing is used.

12. The system as claimed in claim 8, wherein the ETL data pipeline framework is extended by an Apache Hadoop™ cluster, further wherein the Apache Hadoop™ is a unified analytics platform for data processing.

13. The system as claimed in claim 8, wherein the library in the post-processing module is a Python™ library or a SANSA Rdf for RDF graph processing using a data framework for cluster computing.

14. The system as claimed in claim 8, wherein the mapped data is serialized using a N-triple format.

* * * * *